(12) United States Patent
Kaidu et al.

(10) Patent No.: US 12,328,082 B2
(45) Date of Patent: Jun. 10, 2025

(54) MOTOR DRIVE CONTROL DEVICE, MOTOR DRIVE CONTROL SYSTEM, AND MOTOR DRIVE CONTROL METHOD

(71) Applicant: MINEBEA MITSUMI Inc., Nagano (JP)

(72) Inventors: Hiroyuki Kaidu, Kakegawa (JP); Masato Aoki, Iwata (JP); Takamichi Kitano, Kakegawa (JP); Takahiro Suzuki, Fukuroi (JP); Tomotaka Sakuma, Nagano (JP); Yoshihisa Okabuchi, Sapporo (JP)

(73) Assignee: MINEBEA MITSUMI Inc., Nagano (JP)

( * ) Notice: Subject to any disclaimer, the term of this patent is extended or adjusted under 35 U.S.C. 154(b) by 1003 days.

(21) Appl. No.: 17/372,879

(22) Filed: Jul. 12, 2021

(65) Prior Publication Data

US 2022/0021322 A1    Jan. 20, 2022

(30) Foreign Application Priority Data

Jul. 17, 2020    (JP) ................... 2020-122786

(51) Int. Cl.
*H02P 23/00* (2016.01)
*G06N 3/084* (2023.01)
(Continued)

(52) U.S. Cl.
CPC ......... *H02P 23/0018* (2013.01); *G06N 3/084* (2013.01); *H02K 7/14* (2013.01); *H02P 5/74* (2013.01)

(58) Field of Classification Search
CPC ....... H02P 23/0018; H02P 5/74; G06N 3/084; H02K 7/14
See application file for complete search history.

(56) References Cited

U.S. PATENT DOCUMENTS 10,305,413 B2    5/2019  Akashi et al.
2017/0091672 A1*  3/2017  Sasaki ............... H02P 23/0031
(Continued)

FOREIGN PATENT DOCUMENTS

JP    2018-051721 A    4/2018
JP    2018-088179 A    6/2018
(Continued)

OTHER PUBLICATIONS

First Office Action dated Feb. 19, 2024 in the corresponding Japanese Application No. 2020-122786 and English translation.

*Primary Examiner* — Zoheb S Imtiaz
(74) *Attorney, Agent, or Firm* — Chrisman Gallo Tochtrop LLC (57) ABSTRACT

In a motor drive control device including a machine learning function, appropriate motor drive control in accordance with the usage environment of a motor is realized. A motor drive control device 10 includes: a measurement data generation unit 23 that generates measurement data 300 relating to operation of a motor 50; a training data generation unit 24 that attaches predetermined identification information indicating the operation state of the motor 50 to the measurement data 300 and generates training data 310; a machine learning unit 25 that generates a learned model 320 for determining the operation state of the motor 50 by performing machine learning using the training data 310; and a monitor control unit 26 that monitors the operation state of the motor 50 using the learned model 320. In the motor drive control device 10, the training data generation unit 24 starts generation of the training data 310 when the training data generation unit 24 receives a command ordering acquisition of the training data 310 from a host device 4.

10 Claims, 6 Drawing Sheets

(51) Int. Cl.
*H02K 7/14* (2006.01)
*H02P 5/74* (2006.01)

(56) References Cited

U.S. PATENT DOCUMENTS

| | | | |
|---|---|---|---|
| 2017/0154283 A1* | 6/2017 | Kawai | G06F 11/006 |
| 2018/0231956 A1 | 8/2018 | Satou et al. | |
| 2018/0259951 A1 | 9/2018 | Tamakoshi et al. | |

FOREIGN PATENT DOCUMENTS

| | | |
|---|---|---|
| JP | 2018-132809 A | 8/2018 |
| JP | 2018-146448 A | 9/2018 |
| JP | 6506219 B2 | 4/2019 |
| JP | 2020-024139 A | 2/2020 |

\* cited by examiner

| MEASUREMENT DATA | | IDENTIFICATION INFORMATION (CORRECT ANSWER DATA) |
|---|---|---|
| ROTATIONAL SPEED [rpm] | DRIVE CURRENT [A] | |
| 0 | 0 | NORMAL |
| 1610 | 0.04 | NORMAL |
| 3320 | 0.09 | NORMAL |
| 4420 | 0.11 | NORMAL |
| 5520 | 0.15 | NORMAL |
| 6630 | 0.19 | NORMAL |
| 7820 | 0.25 | NORMAL |
| 8900 | 0.3 | NORMAL |
| 10140 | 0.37 | NORMAL |
| ⋮ | ⋮ | ⋮ |
| 21350 | 1.67 | NORMAL |
| 22420 | 1.88 | NORMAL |
| 23500 | 2.13 | NORMAL |

} TRAINING DATA 310

| DRIVE CURRENT (A) | ROTATIONAL SPEED [rpm] | |
|---|---|---|
| | MASS PRODUCTION ENVIRONMENT | USAGE ENVIRONMENT (SERVER) |
| 0.5 | 5000 | 4000 |
| 1 | 10000 | 8000 |
| 1.5 | 15000 | 12000 |

FIG.7

MOTOR DRIVE CONTROL DEVICE, MOTOR DRIVE CONTROL SYSTEM, AND MOTOR DRIVE CONTROL METHOD

CROSS REFERENCE TO RELATED APPLICATIONS

This application claims the benefit of Japanese Patent Application No. 2020-122786, filed Jul. 17, 2020, which is hereby incorporated by reference in its entirety.

BACKGROUND

Technical Field

The present disclosure relates to a motor drive control device, a motor drive control system, a fan system, and a motor drive control method.

Background

Hitherto, a motor control device that performs machine learning by inputting training data (labeled data) from the outside has been known. For example, in Japanese Patent No. 6506219, a motor control device including a machine learning device that learns with use of training data provided from the outside and a motor control unit that controls a current command of a motor based on a learning result of the machine learning device is disclosed.

SUMMARY

The inventors of the present application have considered optimizing, in a motor drive control system that drives a motor of a fan applied to an information processing apparatus such as a server, a program (learned model) for detecting an abnormality of the motor by generating training data by a motor drive control device itself and performing machine learning by the motor drive control device using the generated training data.

When machine learning is performed in a motor drive control system as above, it is important to prepare training data in accordance with an actual usage environment of the motor drive control system.

Figure 7:
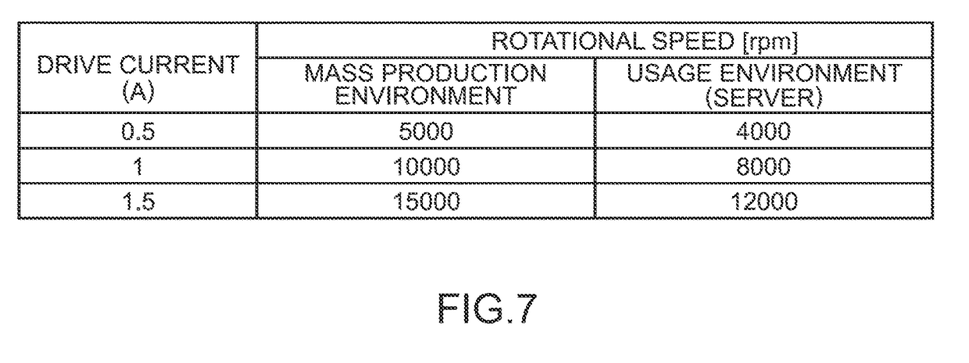
FIG. 7 is a diagram showing one example of measured values of drive currents and rotational speeds of a motor in different usage environments.

FIG. 7 is a diagram showing one example of measured values of drive currents and rotational speeds of a motor in different usage environments. In the same diagram, one example of measurement results of drive currents (currents flowing through a coil of the motor) of the motor and rotational speeds of the motor in each of an environment (mass production environment) in which test operation before the fan (motor) is applied to a system is performed and an environment (actual usage environment) obtained after the fan is applied to a system (server) that is a target of application is shown.

As understood from FIG. 7, in the mass production environment and the actual usage environment of the motor, even when the same drive current is caused to flow, the rotational speed of the motor may differ in accordance with a difference in environment (air pressure, temperature, and the like) due to states of the inside and the outside of the server in which the fan is installed. Therefore, there is a concern that appropriate motor drive control cannot be performed when a learned program generated by learning data measured under the mass production environment of the motor is used under the actual usage environment.

For example, the following case is considered. In the case, by generating training data in which measurement data such as the rotational speed, the drive current, and the temperature of the motor under the mass production environment of the motor is labeled with information indicating that the motor is normal and by performing machine learning of the training data, a program (learned model) for determining whether the motor is in an abnormal state based on the measurement data is generated.

The learned model generated in this case has parameters that are tuned by learning the training data based on the measurement data in the mass production environment, and hence cannot be said to be an optimal program for performing abnormality detection of the motor under the actual usage environment. Therefore, when abnormality detection processing of the motor is performed under the actual usage environment of the fan with use of the learned model, there is a concern that the abnormal state of the motor cannot be accurately detected and appropriate motor drive control cannot be performed.

The present disclosure is related to realizing appropriate motor drive control in accordance with the usage environment of a motor in a motor drive control device including a machine learning function.

A motor drive control device according to a representative embodiment includes: a drive control signal generation unit configured to generate a drive control signal for controlling driving of a motor; a motor drive circuit configured to drive the motor based on the drive control signal; a communication unit configured to communicate with outside; a measurement data generation unit configured to generate measurement data relating to operation of the motor; a training data generation unit configured to attach predetermined identification information indicating an operation state of the motor to the measurement data and generate training data; a machine learning unit configured to generate a learned model for determining the operation state of the motor by performing machine learning using the training data; and a monitor control unit configured to monitor the operation state of the motor using the learned model. In the motor drive control device, the training data generation unit starts generation of the training data when the communication unit receives a command ordering acquisition of the training data from the outside.

In accordance with one aspect of the present disclosure, the appropriate motor drive control in accordance with the usage environment of the motor becomes possible in the motor drive control device including the machine learning function.

DETAILED DESCRIPTION

1. Outline of Embodiment

First, an outline is described for a representative embodiment of the disclosure disclosed in the present application. In the description below, as one example, reference numbers in the drawings corresponding to component elements of the disclosure are described with parentheses.

[1] A motor drive control device (10) according to a representative embodiment of the present disclosure includes: a drive control signal generation unit (11) configured to generate a drive control signal (Sd) for controlling driving of a motor (50); a motor drive circuit (19) configured to drive the motor (50) based on the drive control signal; a communication unit (15) configured to communicate with outside; a measurement data generation unit (23) configured to generate measurement data (300) relating to operation of the motor; a training data generation unit (24) configured to attach predetermined identification information indicating an operation state of the motor to the measurement data and generate training data (310); a machine learning unit (25) configured to generate a learned model (320) for determining the operation state of the motor by performing machine learning using the training data; and a monitor control unit (26) configured to monitor the operation state of the motor using the learned model. In the motor drive control device (10), the training data generation unit starts generation of the training data when the communication unit receives a command ordering acquisition of the training data from the outside.

[2] In the motor drive control device according to abovementioned [1], the drive control signal generation unit may generate the drive control signal to cause the motor to perform aging operation, and the training data generation unit may generate the training data based on the measurement data generated after completion of the aging operation.

[3] In the motor drive control device according to abovementioned [2], the drive control signal generation unit may generate the drive control signal to cause the motor to perform the aging operation when the communication unit receives a command ordering acquisition of the training data from the outside.

[4] In the motor drive control device according to any one of abovementioned [1] to [3], the monitor control unit may order the training data generation unit to acquire the training data when the operation state of the motor satisfies a predetermined condition.

[5] In the motor drive control device according to any one of abovementioned [1] to [4], a training data storage unit (31) for storing the training data in the training data storage unit (31) may be further included, and the training data generation unit may update the training data stored in the training data storage unit with a newly generated piece of the training data.

[6] In the motor drive control device according to any one of abovementioned [1] to [5], the measurement data may include at least one measured value out of a rotational speed of the motor, a drive current of the motor, and temperature, the predetermined identification information may be information indicating whether the motor is normal or abnormal, the learned model may be a program for determining whether the motor is in an abnormal state with the measurement data as an input, and the monitor control unit may monitor the operation state of the motor by determining whether the motor is in an abnormal state based on the measurement data using the learned model.

[7] In the motor drive control device according to abovementioned [6], the monitor control unit may output information indicating detection of an abnormality from the communication unit when the monitor control unit detects an abnormal state of the motor.

[8] A motor drive control system (2) according to a representative embodiment of the present disclosure includes: the motor drive control device (10) according to any one of abovementioned [1] to [7]; and a host device (4) configured to communicate with the motor drive control device. In the motor drive control system (2), the host device transmits a command ordering acquisition of the training data to the motor drive control device.

[9] A fan system (1) according to a representative embodiment of the present disclosure includes: the motor drive control system (2) according to abovementioned [8]; the motor (50); and an impeller (51) formed to be rotatable by a rotational force of the motor.

[10] A motor drive control method according to a representative embodiment of the present disclosure includes: a drive control signal generation step of generating a drive control signal for controlling driving of a motor; a motor driving step of driving the motor based on the drive control signal; a communication step of communicating with outside; a measurement data generation step of generating measurement data relating to operation of the motor; a training data generation step of attaching predetermined identification information indicating an operation state of the motor to the measurement data and generating training data; a machine learning step of generating a learned model for determining the operation state of the motor by performing machine learning using the training data; and a monitor controlling step of monitoring the operation state of the motor using the learned model. In the motor drive control method, the training data generation step includes a step of starting generation of the training data when a command ordering acquisition of the training data is received from the outside in the communication step.

2. Specific Example of Embodiment

Hereinafter, a specific example of the embodiment of the present disclosure will be described with reference to the accompanying drawings. In the description below, component elements shared by embodiments are denoted by the same reference characters, and repetitive descriptions are omitted.

Embodiment

Figure 1:
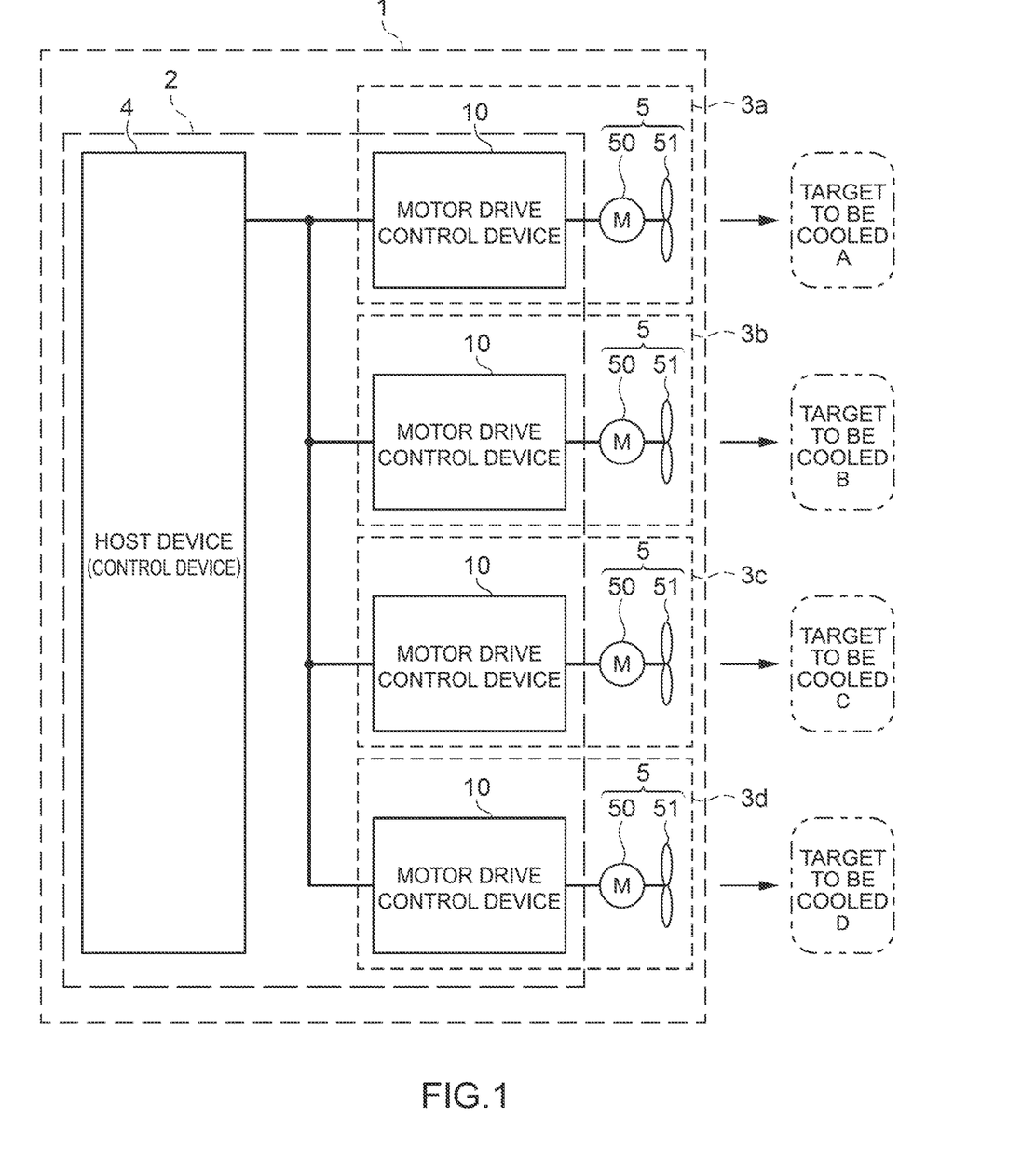
FIG. 1 is a diagram illustrating one example of a configuration of a motor drive control system according to the present embodiment.

FIG. 1 is a diagram illustrating one example of a configuration of a motor drive control system according to the present embodiment.

A motor drive control system 2 illustrated in FIG. 1 is a system that includes one host device (one example of the outside) 4 serving as a control device, and one or more motor drive control devices 10, and drives motors 50 connected to the motor drive control devices 10 by controlling the motor drive control devices 10 by the host device 4.

The motor drive control system 2 is used in an electrical equipment system, for example, and forms a fan system 1 that controls operation of a plurality of fans by one control device and sends air to a plurality of targets to be cooled. The fan system 1 according to the present embodiment is arranged in a closed space in a server and forms a cooling system for cooling various electronic parts and the like forming the server, for example.

The fan system 1 includes, for example, four fan apparatuses 3a to 3d provided so as to correspond to four targets A, B, C, and D to be cooled, and the host device (one example of the control device) 4 that transmits various commands for driving the motors 50 in the fan apparatuses 3a to 3d to the fan apparatuses 3a to 3d.

In the description below, each of the fan apparatuses 3a to 3d is also referred to as the "fan apparatus 3" when the fan apparatuses 3a to 3d are not distinguished from each other. In the present embodiment, a case where the fan system 1 has four fan apparatuses 3a to 3d is described as an example, but the number of the fan apparatuses 3 included in the fan system 1 only needs to be one or more and is not limited. In FIG. 1, a case where communication lines connecting the host device 4 and the fan apparatuses 3 to each other are wired lines is exemplified, but communication between each of the fan apparatuses 3a to 3d and the host device 4 may be wireless communication.

The host device 4 is a control device that controls driving of each of the fan apparatuses 3. For example, when the fan system 1 forms a cooling system for the server, the host device 4 is a program processing device for realizing a main function as the server.

For example, the host device 4 is realized by housing a program processing device (for example, a microcontroller) in one casing with the fan apparatuses 3. The program processing device has a configuration in which a processor such as a CPU, various storage apparatuses such as a RAM and a ROM, and peripheral circuits such as a counter (timer), an A/D conversion circuit, a D/A conversion circuit, a clock generation circuit, and an input/output I/F circuit are connected to each other via a bus or a dedicated line.

The host device 4 controls each of the fan apparatuses 3 so as to set the air flow of the fans (motors) to be appropriate in accordance with environmental change (a change in the processing load, a change in the temperature of the inside of the server, and the like) of the fan system 1, or the situation (a change in the number of the fan apparatuses to be controlled, failure of some fan apparatuses, and the like) of the fan apparatuses to be controlled, for example.

Each of the fan apparatuses 3 includes the motor 50, an impeller 51, and the motor drive control device 10 that controls the driving of the motor 50 in accordance with a command from the host device 4.

The motor 50 is a three-phase brushless motor, for example. The type of the motor 50 is not particularly limited, and the number of phases is not limited to three phases either.

The impeller (vane wheel) 51 is a part that generates wind and is formed to be rotatable by the rotational force of the motor 50. For example, a rotational shaft of the impeller 51 is coaxially coupled to an output shaft of the motor 50. In the present embodiment, for example, the impeller 51 and the motor 50 form one fan (fan motor) 5.

Figure 2:
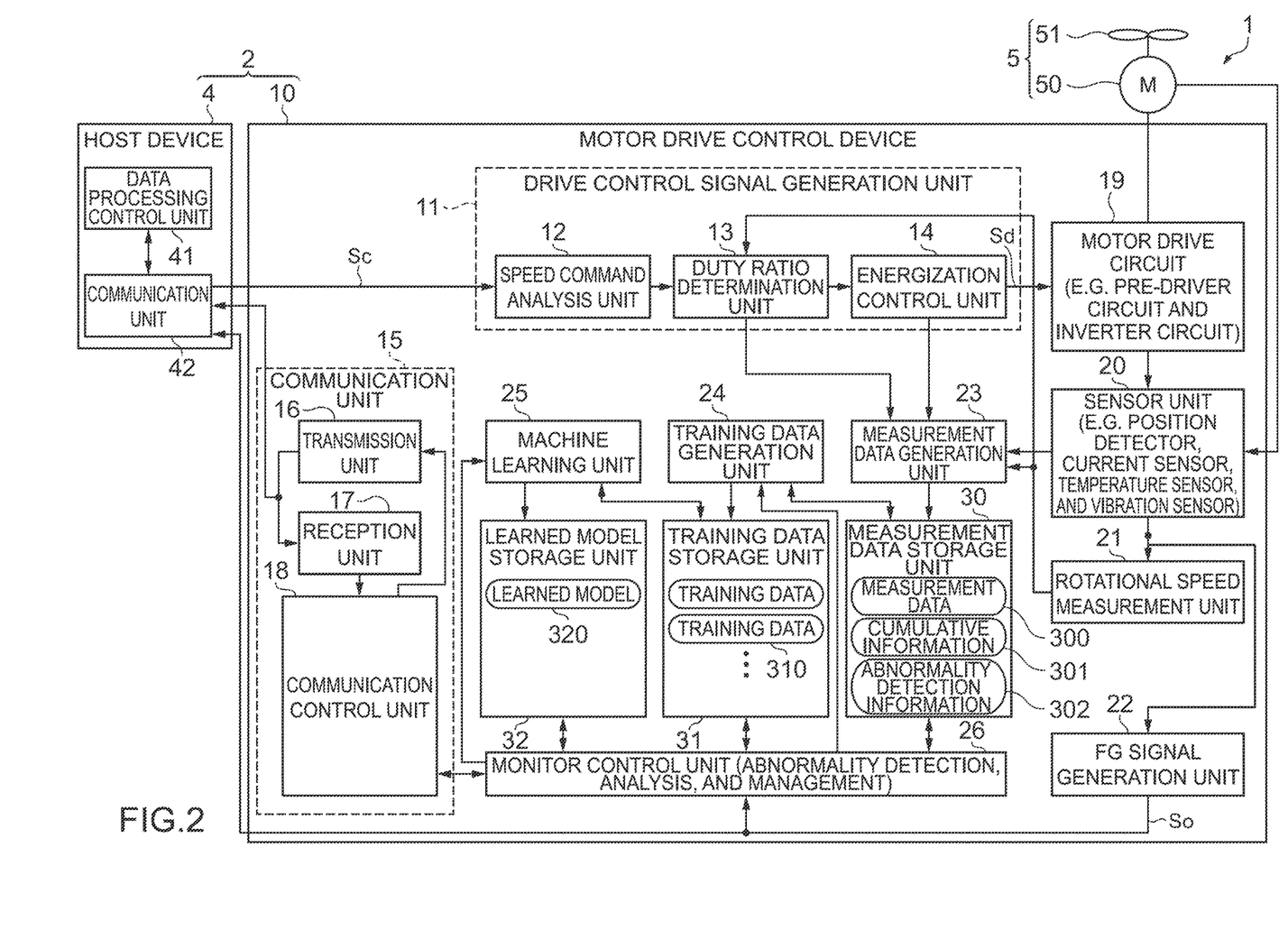
FIG. 2 is a diagram illustrating one example of a specific configuration of a host device and a motor drive control device in a fan system according to the present embodiment.

FIG. 2 is a diagram illustrating one example of a specific configuration of the host device (one example of the outside) 4 and the motor drive control device 10 in the fan system 1 according to the present embodiment.

As illustrated in FIG. 2, the host device 4 includes a data processing control unit 41 for realizing the main function as the server, and a communication unit 42 for performing communication with each of the fan apparatuses 3, for example.

The communication between the host device 4 (communication unit 42) and each of the fan apparatuses 3 (motor drive control devices 10) is realized by serial communication, for example.

The data processing control unit 41 and the communication unit 42 are realized by executing various arithmetic processing in accordance with a program stored in a memory and controlling the peripheral circuits such as the counter and the A/D conversion circuit by the processor in the program processing device forming the host device 4, for example.

The data processing control unit 41 transmits a speed command signal Sc specifying a rotational speed (target rotational speed) serving as a target of the motor 50 of each of the fan apparatuses 3 to each of the fan apparatuses 3 via the communication unit 42 in order to adjust the air flow supplied from each of the fan apparatuses 3 arranged in the server, for example.

The transmission and reception of the speed command signal Sc does not necessarily need to be realized by the serial communication described above and may be realized with use of a dedicated line connecting the host device 4 and each of the fan apparatuses 3 to each other, for example. In this case, the speed command signal Sc may be a PWM signal having a duty ratio in accordance with the target rotational speed, for example.

The data processing control unit 41 monitors the rotation state of the motor 50 of each of the fan apparatuses 3 by receiving a rotational speed signal So (for example, a Frequency Generator (FG) signal) indicating the actual rotational speed (number of revolutions) of the motor 50 output from each of the fan apparatuses 3 via the communication unit 42. The transmission and reception of the rotational speed signal So may be realized with use of a dedicated line connecting the host device 4 and each of the fan apparatuses 3 to each other or may be realized by the serial communication described above, for example.

The data processing control unit 41 requests each of the fan apparatuses 3 to transmit information relating to the operation of the motor 50 such as the drive current and the temperature of the motor 50, the cumulative operation time of the motor 50, and whether an abnormality has occurred via the communication unit 42, and receives information transmitted from each of the fan apparatuses 3 in accordance with the request via the communication unit 42. As a result, the host device 4 can know the drive state of the motor 50 in each of the fan apparatuses 3 in more detail.

Details of the information relating to the operation of the motor 50 transmitted from each of the fan apparatuses 3 are described below.

The data processing control unit 41 orders the motor drive control device 10 of each of the fan apparatuses 3 to execute machine learning via the communication unit 42. Specifically, the data processing control unit 41 orders each of the motor drive control devices 10 to acquire (generate) training data 310 for machine learning and orders each of the motor drive control devices 10 to perform machine learning with use of the acquired training data 310.

The motor drive control device 10 has, as main functions, a motor drive control function for controlling the rotation of the motor, a communication function for performing communication with the host device 4, a training data generation function, a machine learning function, and a monitoring function for monitoring the operation state of the motor 50.

Specifically, as the motor drive control function, the motor drive control device 10 generates a drive control signal Sd in accordance with the command (speed command signal Sc) from the host device 4, causes a drive current in a sinusoidal form to periodically flow through a coil of each phase (for example, three phases) of the motor 50, and rotates the motor 50.

As the communication function, the motor drive control device 10 receives various commands from the host device 4 and transmits a response to the received command and the like to the host device 4 by performing transmission and reception (for example, by serial communication) of data between the motor drive control device 10 and the host device 4.

As the training data generation function, the motor drive control device 10 generates the training data 310 to be used in machine learning by the motor drive control device 10 itself. Specifically, the motor drive control device 10 generates the training data 310 in which identification information (correct answer data) indicating that the motor 50 is in a normal state or an abnormal state is attached to a measured value of a physical quantity relating to the operation state of the motor 50 measured by the motor drive control device 10 itself or input from the outside.

The physical quantity relating to the operation state of the motor 50 includes at least one of the temperatures of the periphery of the motor 50, the drive current (coil current) of the motor 50, the rotational speed of the motor 50, the magnitude (frequency and the like) of the vibration of the motor 50, and the drive voltage of the motor 50, for example.

As the machine learning function, the motor drive control device 10 generates a program (learned model 320) for determining the operation state of the motor 50 by learning the training data 310. Specifically, the motor drive control device 10 generates the learned model 320 serving as a program for determining whether the motor 50 is in an abnormal state by machine-learning the training data 310 created by the motor drive control device 10 itself.

As the monitoring function, the motor drive control device 10 measures the physical quantity relating to the operation state of the motor 50 during the operation of the motor 50 and determines whether the motor 50 is in an abnormal state with use of the measurement result and the learned model 320 created as described above. The motor drive control device 10 generates information (measurement data 300, cumulative information 301, abnormality detection information 302, and the like) relating to the operation of the motor 50 described below based on the measured value of the physical quantity relating to the operation state of the motor 50, the detection result of the abnormal state of the motor 50, and the like, and notifies the host device 4 of the detection of an abnormality of the motor 50 when an abnormality of the motor 50 is detected.

As illustrated in FIG. 2, as function units for realizing each of the functions described above, the motor drive control device 10 includes a drive control signal generation unit 11, a communication unit 15, a motor drive circuit 19, a sensor unit 20, a rotational speed measurement unit 21, an FG signal generation unit 22, a measurement data generation unit 23, a training data generation unit 24, a machine learning unit 25, a monitor control unit 26, a measurement data storage unit 30, a training data storage unit 31, and a learned model storage unit 32, for example.

Out of those function units, the drive control signal generation unit 11, the communication unit 15, the rotational speed measurement unit 21, the measurement data generation unit 23, the training data generation unit 24, the machine learning unit 25, the monitor control unit 26, the measurement data storage unit 30, the training data storage unit 31, and the learned model storage unit 32 are realized by the program processing device, for example. For example, in a program processing device (for example, a microcontroller) having a configuration in which a processor such as a CPU, various storage apparatuses such as a RAM and a ROM, and peripheral circuits such as a counter (timer), an A/D conversion circuit, a D/A conversion circuit, a clock generation circuit, and an input/output I/F circuit are connected to each other via a bus or a dedicated line, function blocks described above are realized by executing, by the CPU, various arithmetic processing in accordance with a program stored in the memory and controlling the peripheral circuits such as the A/D conversion circuit and the input/output interface circuit based on the processing result.

The motor drive control device 10 may have a configuration in which the motor drive circuit 19 and at least some of other function units are packaged as one integrated circuit apparatus (IC), or the motor drive circuit 19 and the other function units are packaged as individual integrated circuit apparatuses.

Hereinafter, each of the function units forming the motor drive control device 10 is described in detail.

The drive control signal generation unit 11 is a function unit for generating the drive control signal Sd for controlling the driving of the motor 50. For example, when the drive control signal generation unit 11 receives the speed command signal Sc output from the host device 4, the drive control signal generation unit 11 generates the drive control signal Sd so as to cause the rotational speed of the motor 50 to match with the target rotational speed specified by the speed command signal Sc.

The drive control signal Sd is a Pulse Width Modulation (PWM) signal, for example.

As illustrated in FIG. 2, the drive control signal generation unit 11 includes a speed command analysis unit 12, a duty ratio determination unit 13, and an energization control unit 14, for example.

The speed command analysis unit 12 receives the speed command signal Sc output from the host device 4 and analyzes the target rotational speed specified by the speed command signal Sc. For example, when the speed command signal Sc is a PWM signal having a duty ratio corresponding to the target rotational speed, the speed command analysis unit 12 analyzes the duty ratio of the speed command signal Sc, and outputs information on a rotational speed corresponding to the duty ratio as the target rotational speed.

The duty ratio determination unit 13 determines the duty ratio of the PWM signal serving as the drive control signal Sd based on the target rotational speed output from the speed command analysis unit 12 and the measured value of the rotational speed of the motor 50 measured by the rotational speed measurement unit 21 described below. Specifically, the duty ratio determination unit 13 calculates the control amount of the motor 50 so as to reduce the difference between the target rotational speed and the measured value of the rotational speed of the motor 50 and determines the duty ratio of the PWM signal in accordance with the control amount.

The energization control unit 14 generates a PWM signal having the duty ratio determined by the duty ratio determination unit 13 and outputs the PWM signal as the drive control signal Sd.

The motor drive circuit 19 drives the motor 50 based on the drive control signal Sd generated by the drive control signal generation unit 11. The motor drive circuit 19 includes an inverter circuit and a pre-driver circuit (not shown), for example.

The inverter circuit outputs a drive signal to the motor 50 based on an output signal output from the pre-driver circuit, and energizes the coil included in the motor 50. The inverter circuit is formed such that a pair of two switch elements in a series circuit each provided on each end of DC power supply are arranged for the coil of each phase, for example. In each pair of two switch elements, a terminal of each phase of the motor 50 is connected to connection point of the switch elements.

The pre-driver circuit generates an output signal for driving the inverter circuit based on the drive control signal Sd, and outputs the output signal to the inverter circuit. The pre-driver circuit generates a drive signal for driving each of the switch elements of the inverter circuit based on the drive control signal Sd and outputs the drive signal, for example. Electric power is supplied to each phase of the motor 50 and a rotor of the motor 50 rotates by turning each of the switch elements forming the inverter circuit on/off by the drive signal.

The sensor unit 20 is a function unit that detects the physical quantity relating to the operation state of the motor 50. The sensor unit 20 includes various sensors such as a position detector (for example, a Hall element) that detects the rotational position of the motor 50, a current detector (for example, a shunt resistor) that detects a current flowing through the coil of the motor 50, a temperature sensor (for example, a thermistor) that detects the temperature of the periphery of the motor 50, and a vibration sensor that detects the vibration of the motor 50, for example. Each of the sensors forming the sensor unit 20 outputs an electrical signal in accordance with the detected physical quantity. The sensor unit 20 of the present embodiment has a configuration in which the sensor unit 20 is provided on the inside of the motor drive control device 10, but the sensor unit 20 may be provided on the outside of the motor drive control device 10.

The rotational speed measurement unit 21 is a function unit that measures the rotational speed of the motor 50. The rotational speed measurement unit 21 measures the rotational speed of the motor 50 based on a detection signal (Hall signal) of the Hall element serving as the position detector in the sensor unit 20, and outputs the measurement result, for example.

The FG signal generation unit 22 generates an FG signal serving as the rotational speed signal So indicating the rotational speed of the motor 50. The FG signal generation unit 22 generates a signal (FG signal) having a period (frequency) proportional to the rotational speed of the motor 50 based on the detection signal (Hall signal) output from the Hall element serving as the position detector in the sensor unit 20, for example. The FG signal output from the FG signal generation unit 22 is input to the host device 4 as the rotational speed signal So.

The FG signal generation unit 22 may be realized by an FG pattern formed on a board (printed board) on which the motor 50 is installed, for example.

The communication unit 15 is a function unit for performing communication with the outside. Specifically, the communication unit 15 performs the transmission and reception of data between the communication unit 15 and the host device 4 serving as the control device. The communication unit 15 includes a transmission unit 16, a reception unit 17, and a communication control unit 18, for example.

The transmission unit 16 transmits signals to the outside (for example, external apparatuses such as the host device 4). The reception unit 17 receives signals from the outside (for example, external apparatuses such as the host device 4). The transmission unit 16 and the reception unit 17 are interface circuits for serial communication that are controlled by the communication control unit 18, generate predetermined serial signals, transmit the predetermined serial signals to the communication line, and receive serial signals from the communication line, for example.

The communication control unit 18 realizes the transmission and reception of data between the communication control unit 18 and the host device 4 by transmitting encoded data to the transmission unit 16 and decoding data from the reception unit 17. The communication control unit 18 is realized by program processing by a processor forming the motor drive control device 10 described above, for example.

The communication control unit 18 gives a request command from the host device 4 received by the reception unit 17 to the monitor control unit 26 and transmits a response to the abovementioned request command given from the monitor control unit 26 to the communication unit 42 of the host device 4 from the transmission unit 16.

For example, when the reception unit 17 receives a transmission request for information relating to the operation of the motor 50 transmitted from the host device 4, the communication control unit 18 gives the transmission request to the monitor control unit 26. Then, the communication control unit 18 transmits the information relating to the operation of the motor 50 received from the monitor control unit 26 from the transmission unit 16 to the communication unit 42 of the host device 4 as a response to the abovementioned transmission request.

For example, when the reception unit 17 receives a command ordering the acquisition of the training data 310 and a command ordering the execution of machine learning transmitted from the host device 4, the communication control unit 18 gives those commands to the monitor control unit 26. Then, the communication control unit 18 transmits a response to the abovementioned command given from the monitor control unit 26 from the transmission unit 16 to the communication unit 42 of the host device 4.

The measurement data generation unit 23 is a function unit for generating the measurement data 300 relating to the operation of the motor 50. Specifically, the measurement data generation unit 23 generates the measurement data 300 based on the detection result of the physical quantity relating to the operation state of the motor 50 detected by the sensor unit 20. The measurement data generation unit 23 calculates measured values (digital values) of the physical quantity relating to the operation state of the motor 50 based on electrical signals output from the various sensors of the sensor unit 20 and stores the measured values in the measurement data storage unit 30 as the measurement data 300, for example.

For example, the measurement data generation unit 23 stores, for each unit of time, a detection result of the temperature obtained by the temperature sensor of the sensor unit 20 in the measurement data storage unit 30 as the measurement data 300. The measurement data generation unit 23 stores, for example, the number of revolutions (rotational speed) per unit of time of the motor 50 measured by the rotational speed measurement unit 21 in the measurement data storage unit 30 as the measurement data 300. The measurement data generation unit 23 stores, for example, for each unit of time, a detection value of the drive current of the motor 50 obtained by the current sensor of the sensor unit 20 in the measurement data storage unit 30 as the measurement data 300. The measurement data generation unit 23 calculates, for example, for each unit of time, the magnitude of the vibration based on a detection signal from the vibration sensor of the sensor unit 20 and stores the magnitude of the vibration in the measurement data storage unit 30 as the measurement data 300.

The measurement data generation unit 23 may also store information on the duty ratio determined by the duty ratio determination unit 13 and information on a rising timing of the PWM signal serving as the drive control signal Sd output from the energization control unit 14 and the like in the measurement data storage unit 30 as the measurement data 300.

The acquisition of the measurement data 300 by the measurement data generation unit 23 may be performed in accordance with a command from the host device 4.

The training data generation unit 24 is a function unit that generates the training data 310 to be used in machine learning based on the measurement data 300 in accordance with an order from the monitor control unit 26.

The training data generation unit 24 generates the training data 310 by attaching predetermined identification information indicating the operation state of the motor 50 to the measurement data 300. Specifically, the training data generation unit 24 stores the following data in the training data storage unit 31 as the training data 310. In the data, identification information (label) indicating that the motor 50 is in a normal state (or an abnormal state) is attached to the measurement data 300 read out from the measurement data storage unit 30.

For example, the training data generation unit 24 generates the training data 310 by labeling at least one measured value out of the temperature of the periphery of the motor 50, the drive current (coil current) of the motor 50, the rotational speed of the motor 50, the magnitude (frequency and the like) of the vibration of the motor 50, and the drive voltage of the motor 50 included in the measurement data 300 with identification information indicating that the motor 50 is normal.

When the training data generation unit 24 generates the training data 310, the training data generation unit 24 treats the measurement data 300 to be used as data acquired in a state in which the motor 50 is performing normal operation. In other words, the training data generation unit 24 generates the training data 310 by labeling the measurement data 300 with identification information (correct answer data) indicating that the motor 50 is "normal" without performing processing for analyzing and determining whether the measurement data 300 is data indicating that the motor 50 is normally operating.

Figure 3:
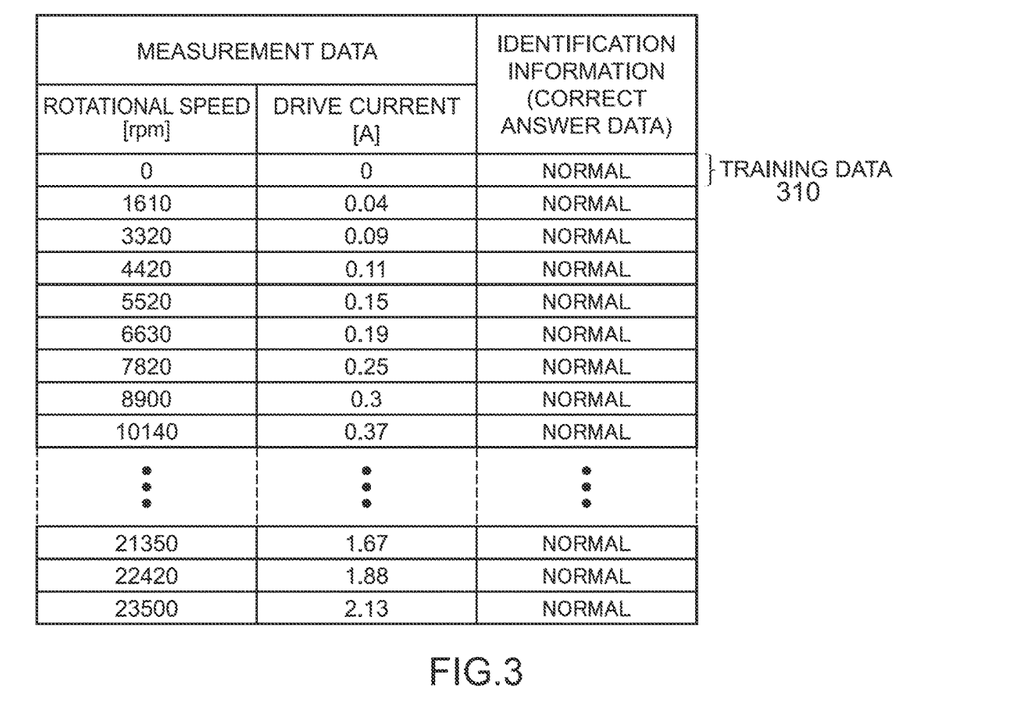
FIG. 3 is a diagram showing one example of training data according to the present embodiment.

FIG. 3 is a diagram showing one example of the training data 310 according to the present embodiment.

In the same diagram, the training data 310 is shown as one example. In the training data 310, a data pair in which the measured value of the rotational speed of the motor 50 and the measured value of the drive current of the motor 50 are combined with each other serving as the measurement data 300 is labeled with information indicating that the motor 50 is "normal" as the identification information (correct answer data).

The measured values to be used in the training data 310 are not limited to a data pair described above in which the rotational speed and the drive current are combined with each other, and may be selected, as appropriate, in accordance with the content of the abnormality to be detected. For example, the measured values may be a data pair in which the measured value of the temperature is combined in addition to the rotational speed and the drive current, or it is also possible to only use the measured value of the temperature when abnormality determination for only the temperature is performed.

When the communication unit 15 receives a command ordering the acquisition of the training data 310 from the outside, the training data generation unit 24 starts the generation of the training data 310. For example, when the reception unit 17 receives a command ordering the acquisition of the training data 310 transmitted from the host device 4, the monitor control unit 26 orders the measurement data generation unit 23 and the training data generation unit 24 to start the acquisition of the measurement data 300 and the generation of the training data 310.

In accordance with the order from the monitor control unit 26, the measurement data generation unit 23 generates the measurement data 300 and sequentially stores the measurement data 300 in the measurement data storage unit 30 by the approach described above. In accordance with the order from the monitor control unit 26, the training data generation unit 24 sequentially generates the training data 310 as shown in FIG. 3 by reading out the measurement data 300 successively stored in the measurement data storage unit 30 by the measurement data generation unit 23 and attaching identification information (label) indicating that the motor 50 is "normal" and stores the training data 310 in the training data storage unit 31.

When the training data generation unit 24 generates the training data 310, the training data generation unit 24 may overwrite the training data 310 generated in the past stored in the training data storage unit 31 and update the training data 310 to new training data 310.

As described below, when aging operation of the motor 50 is performed, the training data generation unit 24 generates the training data 310 based on the measurement data 300 generated after the completion of the aging operation.

The machine learning unit 25 is a function unit that generates the learned model 320 for determining the operation state of the motor 50 by performing machine learning with use of the training data 310.

The learned model 320 is a program based on machine learning of a predetermined technique (algorithm).

The predetermined technique (algorithm) includes statistical estimation, reinforcement learning, and deep learning using a neural network such as a Convolutional Neural Network (CNN), a linear regression, a Boltzmann machine, a support vector machine, a Bayesian network, a Sparse regression, a decision tree, and a random forest, for example.

In the present embodiment, the learned model 320 for determining the operation state of the motor 50 is a program for determining whether the motor 50 is in an abnormal state with the measurement data 300 as an input, for example. More specifically, the learned model 320 is a program for causing the processor to function so as to perform operation based on a predetermined learned parameter with use of input data and output a value obtained by quantifying whether the motor 50 is in an abnormal state, the input data being the measurement data 300 (for example, the drive current of the motor 50, and the rotational speed, the temperature, and the magnitude of the vibration of the motor 50).

The learned parameter is a parameter mechanically adjusted so as to determine whether the motor 50 is in an abnormal state based on the measurement data 300 by using the training data 310 as input data for a program for learning (a program based on the abovementioned predetermined algorithm). For example, for the case of a neural network, the learned parameter is a variable such as a weighting factor.

For example, for the case of a neural network such as a Convolutional Neural Network (CNN), the machine learning unit 25 successively updates the learned parameter and generates the learned model 320 such that an error between output data obtained when the measurement data (the measurement data 300 included in the training data 310) is input to the existing learned model 320 and the correct answer data (the identification information included in the training data 310) becomes smaller by an error backpropagation method.

In the learned model 320, an inference program may be included in addition to the learned parameter described above. The inference program is a program for incorporating the abovementioned learned parameter and outputting a certain result for the input measurement data 300.

In accordance with the order from the monitor control unit 26, the machine learning unit 25 generates (updates) the learned model 320 for determining whether the motor 50 is in an abnormal state by the approach described above by sequentially learning the plurality of the training data 310 stored in the training data storage unit 31 and stores the learned model 320 in the learned model storage unit 32.

Figure 4:
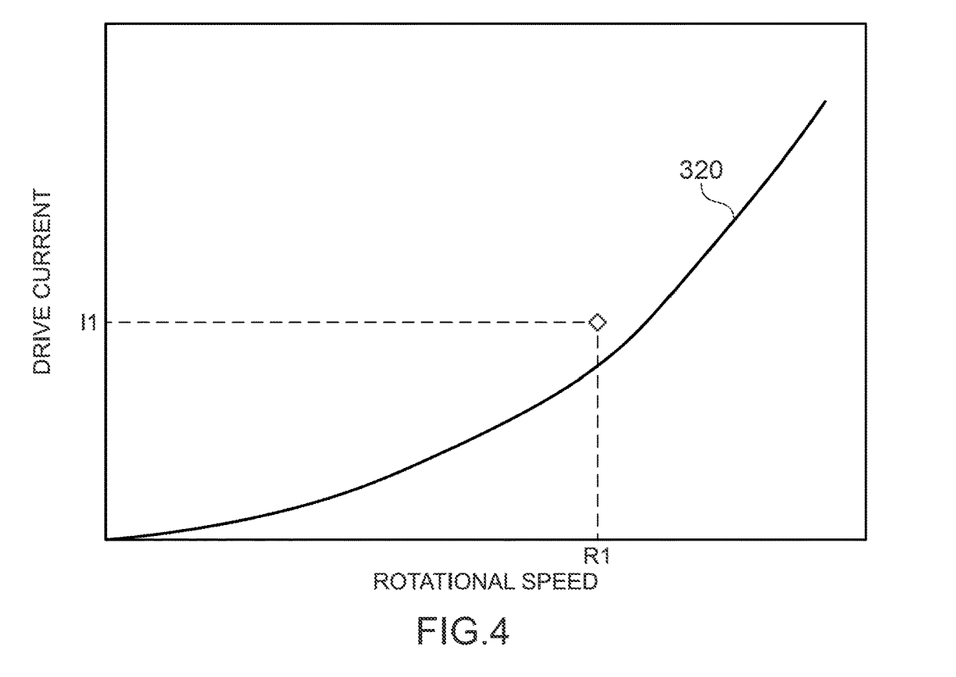
FIG. 4 is a diagram showing one example of learned model according to the present embodiment.

FIG. 4 is a diagram showing one example of the learned model 320 according to the present embodiment.

In the same diagram, one example of the learned model 320 (program) serving as a program for determining whether the motor 50 is in an abnormal state from the rotational speed and the drive current of the motor 50 is shown. As one example, the learned model 320 is a program that is expressed by functions of the rotational speed and the drive current and is for determining that the motor 50 is abnormal when the measured values of the rotational speed and the drive current do not exist within a predetermined error range based on the present functions.

For example, the machine learning unit 25 generates the learned model 320 for determining whether the motor 50 is abnormal from the measured values of the rotational speed and the drive current as shown in FIG. 4 by sequentially learning the plurality of training data 310 shown in FIG. 3 and successively updating the learned parameters. The learned model 320 generated by the machine learning unit 25 is stored in the learned model storage unit 32.

The monitor control unit 26 is a function unit that monitors the operation state of the motor 50 and integrally controls the generation of the training data 310, the execution of machine learning, and the like.

The monitor control unit 26 determines whether the motor 50 is in an abnormal state based on the measurement data 300 acquired by the measurement data generation unit 23 with use of the learned model 320 generated by the machine learning unit 25.

For example, a case where the learned model 320 for determining whether the motor 50 is abnormal from the measured values of the rotational speed and the drive current shown in FIG. 4 is used is conceived. In this case, as shown in FIG. 4, when the measured value of the rotational speed of the motor 50 acquired by the measurement data generation unit 23 is "R1" and the measured value of the drive current of the motor 50 acquired by the measurement data generation unit 23 is "I1", the measured values of the rotational speed and the drive current are not included in the predetermined range based on the functions as the learned model 320, and hence the monitor control unit 26 determines that the motor 50 is abnormal.

The monitor control unit 26 generates information relating to the operation of the motor 50 based on the measurement data 300 and stores the information in the measurement data storage unit 30, for example.

The information relating to the operation of the motor 50 includes the measurement data 300, the cumulative information 301, and the abnormality detection information 302, for example.

The cumulative information 301 is information indicating the degree by which the motor 50 has been used. The cumulative information 301 includes information such as the cumulative number of revolutions, the cumulative operation time, and the like of the motor 50, for example.

For example, the monitor control unit 26 calculates the cumulative number of revolutions of the motor 50 by calculating the number of revolutions of the motor per unit of time of the motor 50 based on the rotational speed signal So (FG signal) generated by the FG signal generation unit 22 and adding up the number of revolutions and stores the cumulative number of revolutions in the measurement data storage unit 30. For example, the monitor control unit 26 measures and adds up the operation time for each rotational speed of the motor 50, calculates the cumulative operation time of the motor 50 based on the operation time for each rotational speed that is added up, and stores the cumulative operation time in the measurement data storage unit 30.

The abnormality detection information 302 is information indicating the content of the abnormality that has occurred in the motor drive control device 10 or the motor 50. The information indicating the content of the abnormality is information such as a current abnormality, a voltage abnormality, and a temperature abnormality, for example. When the monitor control unit 26 determines that the motor 50 is abnormal by the abnormality determination processing described above, for example, the monitor control unit 26 generates the abnormality detection information 302 indicating that an abnormality has occurred in the motor 50 and stores the abnormality detection information 302 in the measurement data storage unit 30.

When the monitor control unit 26 determines that the motor 50 is in an abnormal state, the monitor control unit 26 transmits information (abnormality detection information 302) indicating that an abnormality of the motor 50 (fan 5) has been detected to the host device 4 via the communication unit 15. As a result, the host device 4 can know that an abnormality has occurred in the fan apparatus 3.

In accordance with a command from the host device 4, the monitor control unit 26 orders the training data generation unit 24 to generate the training data 310 and orders the machine learning unit 25 to generate the learned model 320. When the operation state of the motor 50 satisfies a predetermined condition, the monitor control unit 26 orders the training data generation unit 24 to generate the training data 310 and orders the machine learning unit 25 to generate the learned model 320.

Hereinafter, a timing for performing the generation of the training data 310 by the motor drive control device 10 is described by giving several examples.

Figure 5:
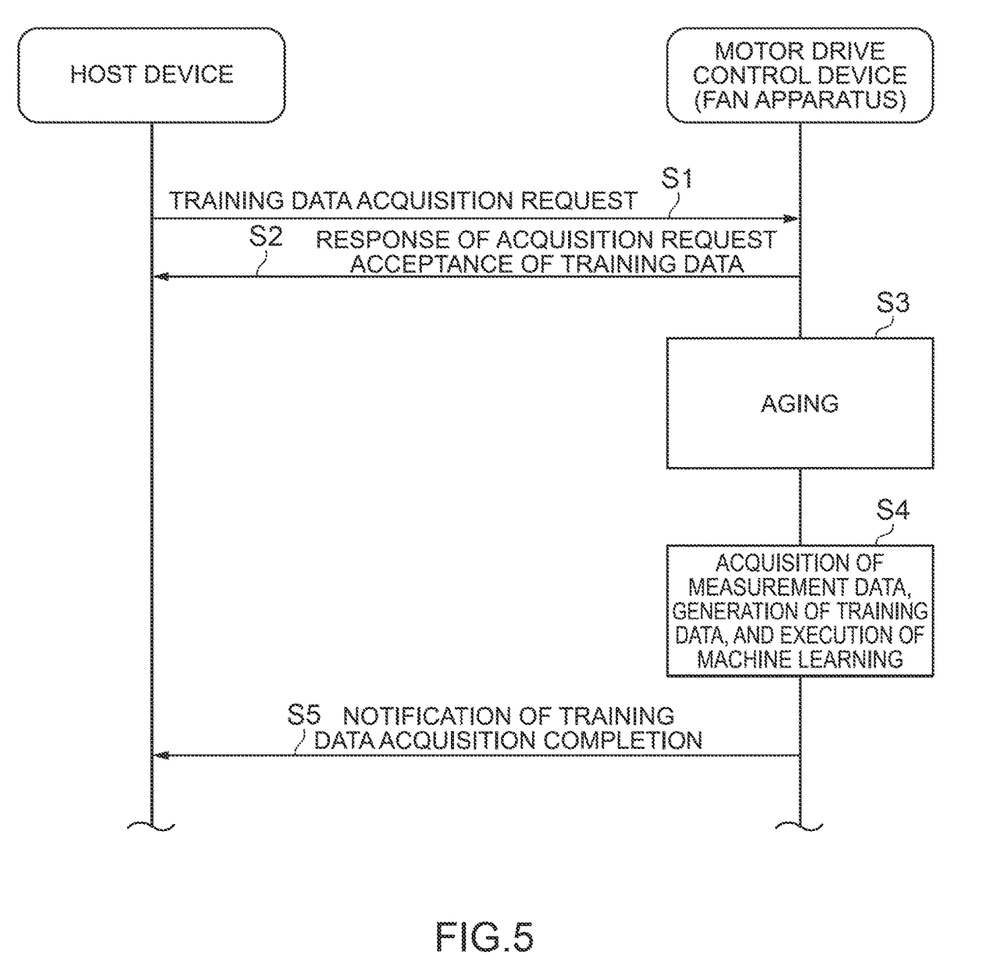
FIG. 5 is a sequence diagram illustrating one example of a timing for generating the training data in the motor drive control system according to the present embodiment.

FIG. 5 is a sequence diagram illustrating one example of a timing for generating the training data 310 in the motor drive control system according to the present embodiment.

For example, a state in which the fan apparatuses 3 each including the motor drive control device 10 are set in the server serving as the host device 4 and are enabled to communicate with the data processing control unit 41 in the host device 4 and each of the motors 50 can normally operate is considered to be an initial state of the fan system 1.

In the initial state, first, the data processing control unit 41 of the host device 4 transmits a request (training data acquisition request) ordering the acquisition of the training data 310 to each of the fan apparatuses 3 forming the fan system 1 via the communication unit 42 (Step S1).

The motor drive control device 10 of each of the fan apparatuses 3 that has received the training data acquisition request transmits a response indicating that the training data acquisition request is accepted to the host device 4 (Step S2).

Thereafter, the motor drive control device 10 of each of the fan apparatuses 3 first causes the motor 50 to perform the aging operation (Step S3). The aging operation is an operation of rotating the motor 50 for a predetermined period of time until grease and the like applied to a power transmission mechanism (machine part) in the fan 5 blend into the power transmission mechanism (machine part), for example.

Specifically, after Step S2, the drive control signal Sd is generated so as to cause the motor 50 to perform the aging operation (cause the motor 50 to rotate at a predetermined rotational speed for a predetermined period of time) by controlling the drive control signal generation unit 11 by the monitor control unit 26.

In this case, the time for performing the aging operation by the motor 50 is specified from the host device 4 with the training data acquisition request or is determined by the fan apparatus 3 side, for example.

After the completion of the aging operation, in the motor drive control device 10, the monitor control unit 26 causes the motor 50 to rotate, and causes the acquisition of the measurement data 300, the generation of the training data 310, and the machine learning to be executed by controlling the drive control signal generation unit 11, the measurement data generation unit 23, the training data generation unit 24, and the machine learning unit 25 (Step S4).

Specifically, after the completion of the aging operation, by giving an order for the predetermined target rotational speed to the drive control signal generation unit 11 by the monitor control unit 26, the drive control signal generation unit 11 generates the drive control signal Sd so as to cause the rotational speed of the motor 50 to match with the target rotational speed and causes the motor 50 to rotate. While the motor 50 rotates, as described above, the measurement data generation unit 23 acquires the detection results of the drive current, the temperature, the magnitude of the vibration, and the like of the motor 50 detected by the sensor unit 20, acquires the measured value of the rotational speed of the motor 50 measured by the rotational speed measurement unit 21, generates the measurement data 300, and sequentially stores the measurement data 300 in the measurement data storage unit 30. At this time, the measurement data generation unit 23 may also store information on the duty ratio of the PWM signal serving as the drive control signal Sd, information on the rising timing of the PWM signal, and the like in the measurement data storage unit 30 as the measurement data 300.

In Step S4, as described above, the training data generation unit 24 generates the training data 310 by labeling the measurement data 300 sequentially stored in the measurement data storage unit 30 with the identification information indicating that the motor 50 is normal, and sequentially stores the training data 310 in the training data storage unit 31. The learned model storage unit 32 generates and updates the learned model 320 by the approach described above by sequentially learning the training data 310 stored in the training data storage unit 31.

In Step S4, the monitor control unit 26 can generate the training data 310 in a plurality of rotational speeds by giving an order for the target rotational speed to the drive control signal generation unit 11 by switching the target rotational speed in stages.

Then, when a predetermined time elapses from the start of the generation of the training data 310 or when the generation and learning of a predetermined number of the training data 310 are completed, for example, the monitor control unit 26 transmits a notification (training data acquisition completion notification) indicating that the acquisition and learning of the training data 310 are completed to the host device 4.

Then, the motor drive control device 10 starts normal drive control of the motor 50. In other words, the motor drive control device 10 drives the motor 50 in accordance with the speed command signal Sc transmitted from the host device 4, monitors the operation state of the motor 50 with use of the learned model 320 generated by the machine learning described above, and notifies the host device 4 of the detection of an abnormality of the motor 50 when an abnormality of the motor 50 is detected.

By the procedure above, the generation of the training data 310 by each of the motor drive control devices 10 is performed.

In the example described above, a case where both processing of the generation of the training data 310 and the machine learning using the training data 310 is performed in Step S4 is exemplified, but it is also possible to perform only the generation of the training data 310 in Step S4. For example, the motor drive control device 10 may perform the generation of the training data 310 in Step S4, transmit the training data acquisition completion notification to the host device 4 in Step S5, wait for an order for the start of machine learning from the host device 4 thereafter, and then start the machine learning using the training data 310.

When the environment in the server greatly changes as in a case where the fan 5 is newly added into the server, for example, the host device 4 may order each of the fan apparatuses 3 to acquire new training data 310.

Figure 6:
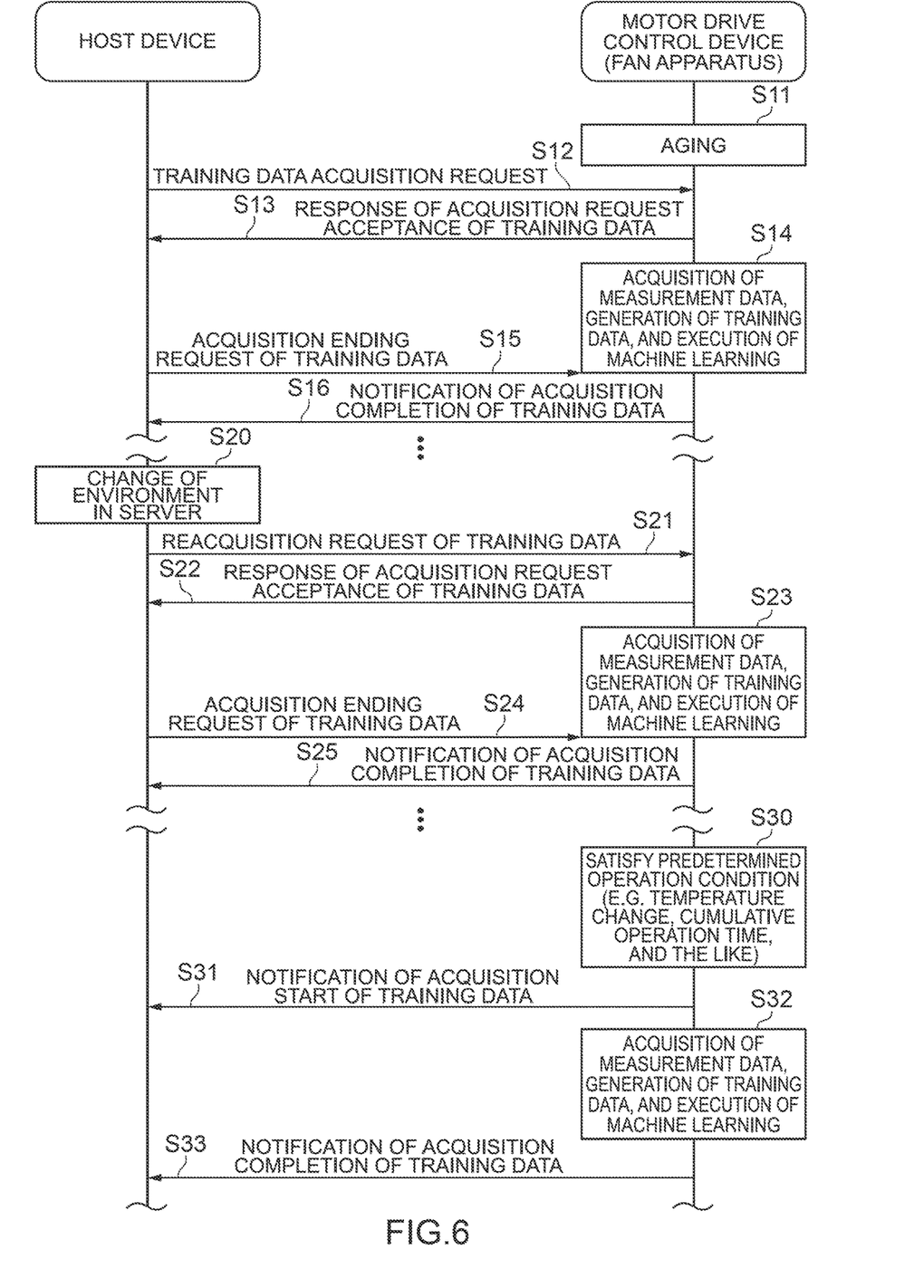
FIG. 6 is a sequence diagram illustrating another example of a timing for generating the training data in the motor drive control system according to the present embodiment.

FIG. 6 is a sequence diagram illustrating another example of a timing for generating the training data 310 in the motor drive control system 2 according to the present embodiment.

As illustrated in FIG. 6, in the initial state of the fan system 1, first, the motor drive control device 10 in each of the fan apparatuses 3 starts the aging operation of the motor 50 (Step S11). After the aging operation ends, the host device 4 transmits a training data acquisition request to each of the fan apparatuses 3 (Step S12).

The motor drive control device 10 of each of the fan apparatuses 3 that has received the training data acquisition request transmits a response indicating that the training data acquisition request is accepted to the host device 4 (Step S13).

Thereafter, as in Step S4 in FIG. 5, the motor drive control device 10 of each of the fan apparatuses 3 causes the motor 50 to rotate and the acquisition of the measurement data 300, the generation of the training data 310, and the machine learning to be executed (Step S14).

Then, when the host device 4 determines that the motor drive control device 10 of each of the fan apparatuses 3 has been able to sufficiently acquire the training data 310 obtained under various environments such as the load and the temperature of the motor 50 that can be supposed in the server, for example, the host device 4 transmits a request (training data acquisition ending request) for ending the acquisition of the training data 310 to each of the fan apparatuses 3 (Step S15).

The motor drive control device 10 of the fan apparatus 3 that has received the training data acquisition ending request stops the processing of generating the training data 310 and transmits a training data acquisition completion notification to the host device 4 (Step S16).

Then, the motor drive control device 10 starts the normal drive control of the motor 50.

During the normal drive control of the motor 50, for example, the host device 4 detects that a state in which the processing load of the server is high has continued for a certain period of time and the environment in the server has significantly changed (Step S20). At this time, the host device 4 transmits a request (training data reacquisition request) for the reacquisition of the training data 310 obtained under the new environment to each of the fan apparatuses 3 (Step S21).

The motor drive control device 10 of each of the fan apparatuses 3 that has received the training data reacquisition request transmits a response indicating that the training data reacquisition request is accepted to the host device 4 (Step S22).

Thereafter, as with Step S14, the motor drive control device 10 of each of the fan apparatuses 3 causes the motor 50 to rotate and executes the acquisition of the measurement data 300, the generation of the training data 310, and the machine learning (Step S23).

Then, when the host device 4 determines that the motor drive control device 10 of each of the fan apparatuses 3 has been able to sufficiently acquire the training data 310 obtained under the environment of the server after the change, the host device 4 transmits a request (training data acquisition ending request) for ending the acquisition of the training data 310 to each of the fan apparatuses 3 (Step S24).

The motor drive control device 10 of the fan apparatus 3 that has received the training data acquisition ending request stops the processing of generating the training data 310 and transmits the training data acquisition completion notification to the host device 4 (Step S25). Then, the motor drive control device 10 performs the normal drive control of the motor 50 again.

During the normal drive control of the motor 50, the monitor control unit 26 of the motor drive control device 10 detects that the operation state of the motor 50 satisfies a predetermined condition (Step S30).

As the predetermined condition, a case where the cumulative operation time of the motor 50 has exceeded a predetermined value, a case where the temperature of the periphery of the motor 50 has changed and the temperature has continued for a certain period of time, a case where the drive current of the motor 50 has changed and the drive current has continued for a certain period of time, and the like can be exemplified.

When the monitor control unit 26 detects that the operation state of the motor 50 satisfies the predetermined condition, the monitor control unit 26 notifies the host device 4 of the start of the acquisition of the training data 310 via the communication unit 15 (Step S31).

Thereafter, as with Step S14, the monitor control unit 26 causes the acquisition of the measurement data 300, the generation of the training data 310, and the machine learning during the rotation of the motor 50 to be executed by controlling the measurement data generation unit 23, the training data generation unit 24, and the machine learning unit 25 (Step S32).

Then, when a predetermined time elapses from the start of the generation of the training data 310 or when the generation and learning of a predetermined number of the training data 310 are completed, for example, the monitor control unit 26 transmits a notification (training data acquisition completion notification) indicating that the generation and learning of the training data 310 are completed to the host device 4 (Step S33).

As described above, the motor drive control device 10 performs the generation of the training data 310 at the timing described above.

As above, when the motor drive control device 10 according to the present embodiment receives a command ordering the acquisition of the training data 310 from the outside (host device 4), the motor drive control device 10 measures the physical quantity relating to the operation state of the motor 50 and generates the training data 310 in which a label indicating whether the motor 50 is in a normal state is attached to the measured value as described above.

According to the above, in an actual usage environment of the motor 50 after the motor drive control device 10 including a machine learning function and the motor 50 (fan 5) are incorporated in the fan system 1 and communication with the host device 4 is enabled, the measurement data 300 can be acquired, the training data 310 can be generated, and the learned model 320 for detecting the abnormality of the motor 50 can be generated with use of the training data 310. As a result, the abnormality detection of the motor 50 can be performed more accurately, and hence appropriate motor drive control of the motor 50 in accordance with the usage environment can be realized.

After the motor drive control device 10 performs the aging operation of the motor 50, the motor drive control device 10 measures the physical quantity relating to the operation state of the motor 50 and generates the training data 310 with use of the measurement data 300.

According to the above, the training data 310 based on the measurement data 300 in a state close to when the fan 5 (motor 50) is actually used can be generated, and hence the precision of the abnormality detection of the motor 50 can be further enhanced.

As illustrated in FIG. 5, when the motor drive control device 10 receives a command ordering the acquisition of the training data 310 from the outside (host device 4), the motor drive control device 10 may cause the motor 50 to execute the aging operation. According to the above, also in a situation in which the aging operation of the motor 50 has not been performed, the measurement data 300 is acquired and the training data 310 is generated after the aging operation is performed first, and hence the abnormality detection of the motor 50 that is more suitable for the actual operation environment can be realized.

The motor drive control device 10 starts the generation of the training data 310 when the operation state of the motor 50 satisfies the predetermined condition described above.

According to the above, even in a situation in which a command from the host device 4 does not exist, the motor drive control device 10 can detect a change in the operation state of the motor 50 and generate the training data 310 by the motor drive control device 10 itself. As a result, the learned model 320 can be appropriately updated in accordance with the operation situation of the motor 50, and hence the motor drive control that is more appropriate in accordance with the usage environment of the motor 50 can be realized.

Expansion of Embodiment

The disclosure made by the inventors of the present disclosure has been specifically described based on the embodiment above, but it goes without saying that the present disclosure is not limited to the embodiment and various modifications can be made without departing from the gist of the disclosure.

For example, in the abovementioned embodiment, a case where the motor drive control device 10 generates the training data 310 based on the measurement data 300 measured by the motor drive control device 10 itself is exemplified, but the present disclosure is not limited to this configuration, and the training data 310 may be generated with use of data provided from the outside. For example, the data processing control unit 41 of the host device 4 acquires a measured value of humidity of the inside (or the outside) of the server measured by a humidity sensor and transmits the acquired measured value of the humidity to the motor drive control device 10. The communication unit 15 of the motor drive control device 10 gives the measured value of the humidity received from the host device 4 to the measurement data generation unit 23, and the measurement data generation unit 23 stores the acquired measured value of the humidity in the measurement data storage unit 30 as the measurement data 300. The training data generation unit 24 generates the training data 310 with use of the measurement data 300 including the measured value of the humidity.

According to the above, the training data 310 can be generated based on the measurement data 300 that cannot be measured by the motor drive control device 10 such as humidity.

The training data 310 generated by the motor drive control device 10 may be able to be read out from the outside. For example, the host device 4 may request the motor drive control device 10 to transmit the training data 310, the motor drive control device 10 that has received the request may transmit the training data 310 stored in the training data storage unit 31 of the motor drive control device 10 itself to the host device 4, and the host device 4 may store the received training data 310 in the storage apparatus on the inside.

The host device 4 may transmit the training data 310 acquired from one fan apparatus 3 as described above to the motor drive control device 10 of another fan apparatus 3. In this case, the motor drive control device 10 that has received the training data 310 may perform machine learning with use of the training data 310 and generate or update the learned model 320 of the motor drive control device 10 itself.

In the abovementioned embodiment, a case where the learned model 320 is a program for determining whether the motor 50 is in an abnormal state is exemplified, but the learned model 320 only needs to be a program for controlling the driving of the motor 50 and is not limited to this configuration. For example, the learned model 320 may be a program of which input is the measurement data 300 and which corrects the command value of the drive current of the motor 50, the target rotational speed, and the like in accordance with the operation environment of the motor 50.

The sequence diagrams described above are specific examples, and the present disclosure is not limited to those sequence diagrams. For example, other processing may be inserted between the steps, and processing may be parallelized.

The number of phases of the motor driven by the motor drive control device of the embodiment described above is not limited to three phases. The number of the Hall elements is not limited to three.

A detection method of the rotational speed of the motor is not particularly limited. For example, the rotational speed may be detected by a position sensor-less method of detecting the rotational speed with use of a back electromotive force induced in a motor coil without using a position detector such as the Hall element.

What is claimed is:

1. A motor drive control device comprising:
   a drive control signal generation unit configured to generate a drive control signal for controlling driving of a motor;
   a motor drive circuit configured to drive the motor based on the drive control signal;
   a communication unit configured to communicate with a host device transmitting a command ordering acquisition of the training data;
   a measurement data generation unit configured to generate measurement data relating to operation of the motor;
   a training data generation unit configured to start attaching predetermined identification information indicating an operation state of the motor to the measurement data and generating training data when the communication unit receives the command ordering acquisition of the training data from the host device;
   a machine learning unit configured to generate a learned model for determining the operation state of the motor by performing machine learning using the training data; and
   a monitor control unit configured to monitor the operation state of the motor using the learned model.

2. The motor drive control device according to claim 1, wherein:
   the drive control signal generation unit generates the drive control signal to cause the motor to perform aging operation; and
   the training data generation unit generates the training data based on the measurement data generated after completion of the aging operation.

3. The motor drive control device according to claim 2, wherein the drive control signal generation unit generates the drive control signal to cause the motor to perform the aging operation when the communication unit receives a command ordering acquisition of the training data from the host device.

4. The motor drive control device according to claim 1, wherein the monitor control unit orders the training data generation unit to acquire the training data when the operation state of the motor satisfies a predetermined condition.

5. The motor drive control device according to claim 1, further comprising a training data storage unit for storing the training data in the training data storage unit, wherein the training data generation unit updates the training data stored in the training data storage unit with a newly generated piece of the training data.

6. The motor drive control device according to claim 1, wherein:
   the measurement data includes at least one measured value out of a rotational speed of the motor, a drive current of the motor, and temperature, the predetermined identification information is information indicating whether the motor is normal or abnormal;

the learned model is a program for determining whether the motor is in an abnormal state with the measurement data as an input; and the monitor control unit monitors the operation state of the motor by determining whether the motor is in an abnormal state based on the measurement data using the learned model.

7. The motor drive control device according to claim 6, wherein the monitor control unit outputs information indicating detection of an abnormality from the communication unit when the monitor control unit detects an abnormal state of the motor.

8. A motor drive control system comprising:

the motor drive control device according to claim 1; and the host device configured to communicate with the motor drive control device, wherein the host device transmits the command ordering acquisition of the training data to the motor drive control device.

9. A motor drive control method comprising:

a drive control signal generation step of generating a drive control signal for controlling driving of a motor;

a motor driving step of driving the motor based on the drive control signal;

a communication step of communicating with a host device transmitting a command ordering acquisition of the training data;

a measurement data generation step of generating measurement data relating to operation of the motor;

a training data generation step of starting to attach predetermined identification information indicating an operation state of the motor to the measurement data and to generate training data when the command ordering acquisition of the training data is received from the host device;

a machine learning step of generating a learned model for determining the operation state of the motor by performing machine learning using the training data; and a monitor controlling step of monitoring the operation state of the motor using the learned model.

10. The motor drive control device according to claim 1, further comprising a measurement data storage unit, wherein the measurement data generation unit acquires the measurement data from the host device via the communication unit and stores the acquired measurement data in the measurement data storage unit, and the training data generation unit generates the training data using the measurement data, including the acquired measurement data from the host device.

* * * * *